(No Model.) 3 Sheets—Sheet 1.
M. N. LYNN.
VALVE GEAR FOR STEAM ENGINES.
No. 332,205. Patented Dec. 8, 1885.
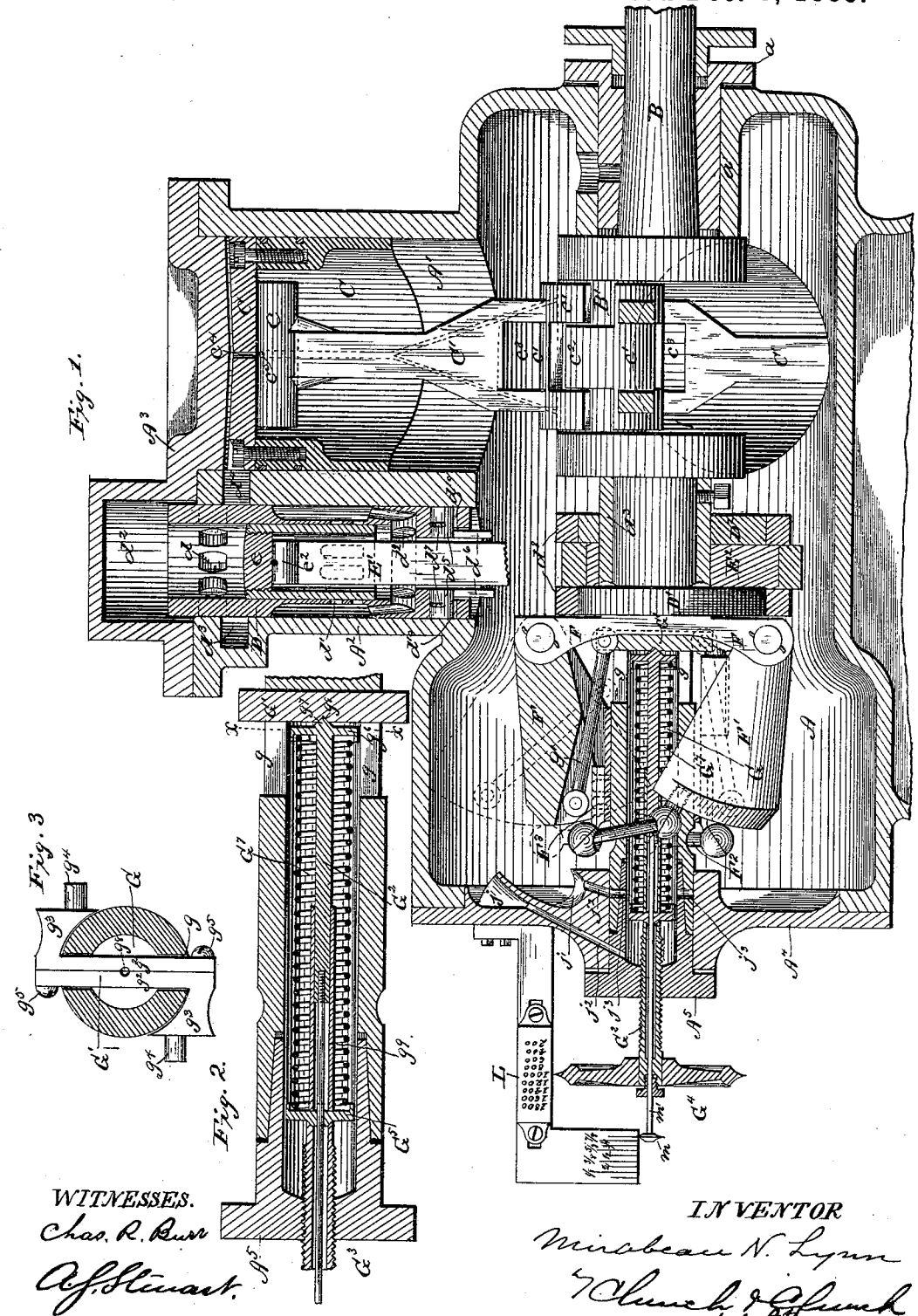
WITNESSES.
Chas. R. Burr
A. J. Stuart.
INVENTOR
Mirabeau N. Lynn
Church & Church
his Attorneys.

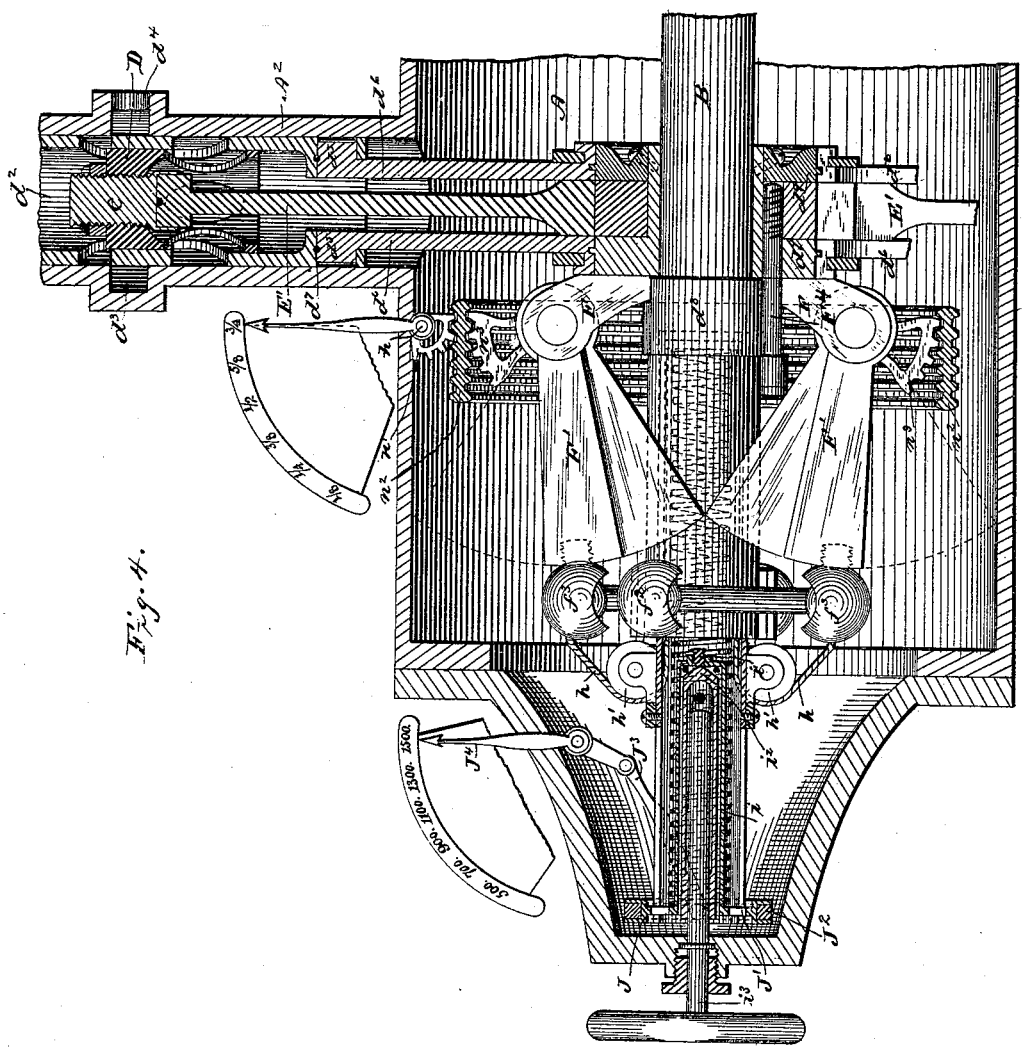

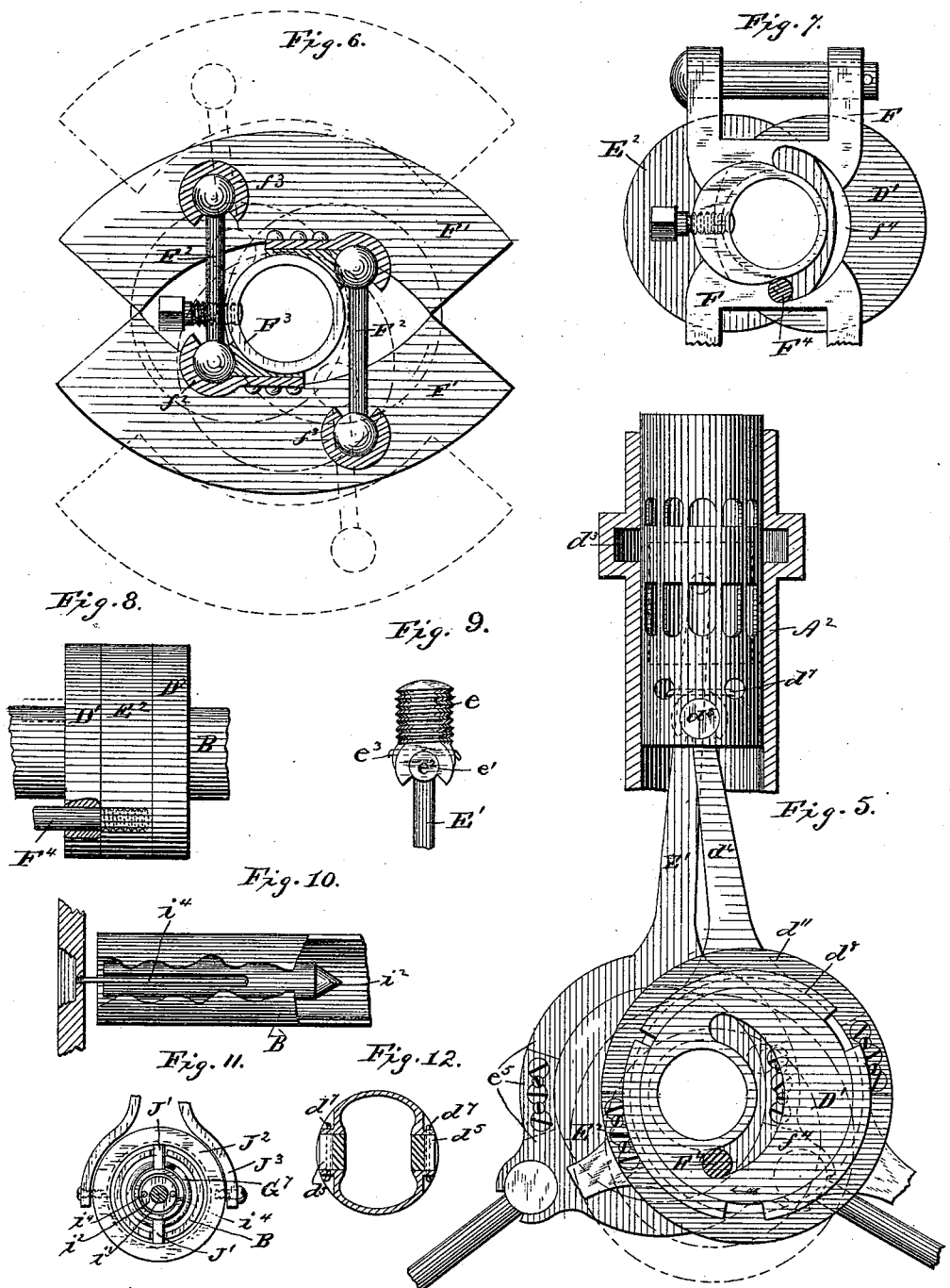

UNITED STATES PATENT OFFICE.

MIRABEAU N. LYNN, OF RISING SUN, ASSIGNOR TO THE AMERICAN ELECTRIC HEADLIGHT COMPANY, OF INDIANAPOLIS, INDIANA.

VALVE-GEAR FOR STEAM-ENGINES.

SPECIFICATION forming part of Letters Patent No. 332,205, dated December 8, 1885.

Application filed March 14, 1885. Serial No. 158,898. (No model.)

*To all whom it may concern:*

Be it known that I, MIRABEAU N. LYNN, of Rising Sun, in the county of Ohio and State of Indiana, have invented certain new and useful Improvements in Valve-Gear for Steam-Engines; and I do hereby declare the following to be a full, clear, and exact description of the same, reference being had to the accompanying drawings, forming a part of this specification, and to the figures and letters of reference marked thereon.

This invention relates to certain improvements in the construction of steam-engines and the valve mechanism thereof, designed more especially for use in connection with the multiple-cylinder type, but applicable in several particulars to other forms of steam-engines, whereby a high-speed engine is produced with an automatic cut-off mechanism, which latter can be adjusted while the engine is in motion, and, being once set, is self adjusting, said engine also having the capacity of being started at any point, delivering steam to the cylinders at boiler-pressure, and indicating simultaneously at each adjustment the number of revolutions and point of cut-off.

The invention as embodied in a multiple-cylinder engine will first be described, and the novel features pointed out in the appended claims.

In the accompanying drawings, Figure 1 is a longitudinal section of a multiple-cylinder engine, showing one mode of applying my invention. Fig. 2 is a longitudinal section of the mechanism for mounting and adjusting the spring controlling the governor. Fig. 3 is a transverse section on the line $x\ x$, Fig. 2. Fig. 4 illustrates in longitudinal section a modification of the automatic valve-regulating mechanism, as shown in Fig. 1. Fig. 5 is a view, partly in section, of the fixed and adjustable eccentrics, valve, and cut-off, as in Figs. 1 and 4. Fig. 6 is an end view of the governor-weights, Fig. 4. Figs. 7 and 8 are detail views of the eccentrics. Fig. 9 illustrates the manner of attaching the cut-off valve to its connecting-rod. Fig. 10 is a side elevation, partly in section, of the adjustable pivot and the means for preventing its rotation. Fig. 11 is an end view of the adjustable pivot, showing the manner of attaching the speed-indicator shown in Fig. 4. Fig. 12 is an end view, partly in section, of the steam-valve, showing the manner of attaching the pitmen thereto.

Similar letters of reference in the several figures indicate the same parts.

In the illustration given the main frame or casing, within which all the operative parts of the engine are mounted and inclosed, is cast in one piece, and is composed of the central chamber, A, with radial piston-cylinders A' and valve cylinders or chests $A^2$, all of said cylinders communicating with the central chamber, their outer ends being closed by cap plates or heads $A^3$, bolted or otherwise suitably secured in place. The main driving-shaft B extends longitudinally through the central chamber, A, being supported at one end in an adjustable journal-box, $a$, fitting a bearing, $a'$, formed in the main casing, said bearing being tapered to receive a tapered portion of the shaft B, and at the other end of the chamber the shaft is supported in a bearing formed in a removable head, $A^4$; or other suitable bearing or supports may be provided, as the exigencies of the case demand.

The devices which go to make up the operating portions of the engine may be considered under four heads—*i. e.*, the piston and connections, the steam-valve and connections, the cut-off and connections, and the governing mechanism for the cut-off—each of which constitutes and embodies special features of invention, and at the same time the several devices as arranged and combined are interdependent the one upon the other, and co-operate in producing or effecting the improved results obtained.

The pistons C, working in the cylinders A', are disposed opposite a crank-pin, B', on the shaft B, and are connected thereto by pitmen C'. Each pitman is provided with a T-head, $c$, by which it is pivotally secured to the piston, and an arc-shaped saddle, $c'$, resting upon the crank-pin, the several saddles being retained in place by interlocking projections, $c^2$, and a divided ring or collar passing through slots $c^3$ in the pitmen, as set forth in an application filed December 23, 1884, Serial No. 151,053, as the joint invention of George N.

Wheeler and myself. As thus constructed and arranged, the several pitmen are independently applied to the same crank-pin, and in order the better to lubricate the surfaces of the saddles and crank-pin a small opening, $c^4$, is made in the piston C, and a similar opening, $c^6$, is made in the pitman extending through the saddle, as shown, whereby the condensed steam, together with any oil that may be carried thereby and deposited on the surface of the piston, will, when the opening in the head of the pitman registers with that in the piston, be delivered on the crank-pin and serve to lubricate the surfaces.

The steam-valve proper, or that by which the cylinders are alternately put into communication with the steam chest or pipe leading from the boiler and the exhaust, consists, essentially, of a tubular valve, D, provided with the inlet-ports $d$ and exhaust-ports $d'$, and arranged to reciprocate in the valve-cylinders $A^2$. The valve D is divided into two sections by a diaphragm or piston, E, the outer section opening into the steam-chest $d^2$, and the inner communicating with the central chamber, A. Within the valve-cylinder $A^2$ is formed an annular chamber, $d^3$, with a passage, $d^4$, leading to the cylinder A'. When the valve D is reciprocated in the cylinder $A^2$, the steam is admitted to the cylinder A' through the ports $d$, and exhausted through the ports $d'$, as those ports are brought opposite the chamber $d^3$, as is well understood.

It is my intention that the valves D shall have the widest and best proportioned ports to freely admit and exhaust steam in the cylinder, and shall also be given a definite and regular movement, and to this end they are arranged to be driven by a fixed eccentric or eccentrics on the main shaft B.

In the present instance two eccentrics, D' $D^2$, are employed, set at the same angle and having the same throw; hence they operate substantially as one eccentric. Two pitmen, $d^6$, are employed for each valve D, one extending to the eccentric D', and the other to the eccentric $D^2$. The manner of attaching and applying these pitmen is as follows: In the lower or inner end of the valve D are drilled or otherwise formed diametrically-opposite openings or bearings $d^{10}$, to receive a boss or pin, $d^5$, projecting laterally from the outer end of the pitman $d^6$. The boss or pin $d^5$, being inserted in the bearing $d^{10}$, is retained in place by means of a pin or soft wire, $d^7$, inserted through a transverse opening formed in the valve, said wire resting within a circumferential groove in the boss or pin $d^5$, and having its ends bent down, as shown. By this method of attaching and securing the ends of the pitmen to the valve I am enabled to dispense with the usual nuts, screws, &c., which are liable to become loose, at the same time simplifying the construction and facilitating the attachment and removal of the parts. The lower or inner end of each pitman is provided with an arc-shaped saddle, $d^8$, resting upon the face of the eccentric, the several saddles being held in place by a divided ring, $d^{11}$, resting in a groove, as shown in Figs. 4 and 5; and, if desired, a ring or flange, $d^9$, may be formed upon the face of the eccentric, and the inner faces of the saddles may be grooved to fit said flange, whereby the pitmen will be more accurately held and prevented from twisting or becoming misplaced. While this method of attachment and guiding the pitmen is believed to be novel and possesses marked advantages, it is obvious that other devices capable of properly and securely retaining the pitmen may be substituted, such, for example, as those shown applied to the piston and crank.

Having thus described the piston and valve operating mechanism, which as combined constitute an efficient steam engine, I will next proceed to explain how a cut-off can be applied, which, without diminishing the pressure of the steam in the steam-chest, or as delivered to the cylinder through the valve D, shall quickly and positively interrupt the flow of steam through the valve at any desired point in the stroke of the piston. The devices shown for accomplishing this object consist, essentially, of the piston E. (when the automatic cut-off is not employed this is fixed and serves only as a diaphragm separating the steam-valve into its two sections, as described,) located within the tubular valve D, and lying normally between the inlet and exhaust ports, a pitman, E', and an adjustable eccentric or driver, $E^2$, for giving the requisite movements to the piston E, as will be described. The pitman E' can conveniently be attached to the piston E in the following manner: To the center of the piston is applied (as by a screw-threaded connection) a detachable plug, $e$, in the end whereof is formed a transverse open bearing, $e'$. The end of the pitman $E^2$ is formed with a transverse semi-cylindrical boss or head, $e^2$, adapted to slide endwise within the bearing $e'$, and when in place the two are fastened in position by a pin or soft-metal wire, $e^3$, engaging a groove in the head $e^2$, and having its ends bent to prevent accidental withdrawal.

It will be observed that the pitman E' is somewhat longer than the pitmen $d^6$, and as it passes up between said pitmen and into the valve D it serves as an additional means to prevent the accidental withdrawal of the heads of the said pitmen from the sockets or bearings in the valve D. As, however, the pitman E', when thus arranged, obstructs in a measure the exhaust-passage, it is found expedient to provide additional passages $d^{12}$ through the lower portion of the valve D, (see Fig. 1,) through which the exhaust-steam can escape, said passages supplementing the exhaust through the center of the valve.

The eccentric $E^2$, for actuating the piston E, is preferably located between the eccentrics D' D², being supported upon the sleeve $d^{13}$. This sleeve $d^{13}$, secured to the eccentric D', is concentric with the shaft B, and to it is also removably applied the eccentric D², whereby the several eccentrics are detachably secured together and to the shaft B.

The manner of attaching or applying the several pitmen E' to their eccentric differs somewhat from that employed with the other pitmen, for the reason that as each piston E is subjected to the direct action of the steam in the steam-chest, the pressure and friction upon the eccentric would be unduly multiplied. In order to overcome this objectionable feature, I form one of the pitmen, E', with a divided collar, $e^5$, embracing the eccentric E², and to this collar I pivot the inner ends of the remaining pitmen, connecting them by a joint similar to that employed for attaching their outer ends to the pistons E, as shown in Fig. 5. As thus arranged, the pressure of the steam upon the several pistons is borne by the collar $e^5$ instead of the eccentric, and a practical balancing of the pistons and their connecting mechanism is thereby secured, so that but little power is required to turn the eccentric and actuate the pistons.

The mechanism described, constituting the cut-off, is designed to operate in the following manner: The three eccentrics D', D², and E² are arranged to move with and be revolved by the shaft B. The eccentric E², which has the same throw as the eccentrics D' D², being set at the same angle as the valve-eccentrics, the piston E will be moved in unison with the valve D, and operate merely as a fixed diaphragm, the admission and exhaust of steam being effected by the valve D alone. When, now, it is desired to cut off the steam at any point in the throw of the piston, so it may act by expansion only, the eccentric E² is set forward, or in advance of the eccentrics D' D², the proper distance, the effect of which is to produce at or near the inner and outer throw of the eccentrics a differential movement of the valve and piston. The effect of this differential movement of the piston and valve is to cause the piston E to move outward in advance of the outward movement of the valve D, and while its inlet-ports are opposite the chamber $d^3$, thereby covering the inlet-ports on the inner side and cutting off the supply of steam at a point where the valve D would otherwise continue to admit it to the cylinder.

In Figs. 5 and 7 the eccentric E² is set at a point on the shaft diametrically opposite the eccentrics D' D², and in position to cut off at about one-eighth stroke.

It will be noticed that the stroke of the valve proper, D, remains the same under all circumstances, opening wide the inlet and exhaust ports, while the piston E, constituting the cut-off, operates quickly, the piston and valve moving in opposite directions, and at any desired part of the stroke, according to the position in which the eccentric E² is placed, is adapted to cut off the steam-supply, while the exhaust is not interfered with but remains full and open.

While various forms of regulating mechanism have been devised for actuating the cut-off valve, many of which can be applied so as to preserve the benefits of the arrangement thus far described, the preferred form is that shown in Fig. 1, and of which Fig. 2 represents a modification in respect to certain details, as will be hereinafter pointed out.

Upon the side of the eccentric D' is cast or otherwise secured a pair of brackets, F, and in each bracket is secured by a transverse bolt or pivot one end of a weight, F'. These weights are made approximately in the shape of a frustum of a cone, divided vertically into two equal sections, and are pivoted to the brackets at or near the smaller end or ex of the cone. As indicated in Figs. 1, 4, and 6, the inner faces of the weights are grooved or hollowed out longitudinally, in order that they may, when closed, embrace the shaft B, with their outer surfaces substantially parallel. This manner of constructing and arranging the weights possesses many advantageous features—such as the accommodation of heavier weights, their advantageous disposition with respect to the rotating shaft, occupying the minimum of space with a wide range of motion—all of which may, with like benefits, be incorporated in other forms of governors.

The outer ends of the weights F' are connected by toggle-pins F² to a sleeve, F³, surrounding the shaft B, and connected by a removable pin, F⁴, with the movable eccentric E². These toggle-pins F² are formed with spherical heads received within socket-bearings $f^2$ on the sleeve and $f^3$ on the weights, forming a ball-and-socket connection at either end of the toggle-pin. The pin F⁴, connecting the movable eccentric E² of the cut-off mechanism with the sleeve F³, passes through an arc-shaped slot, $f^4$, in the eccentric D'.

The weights, toggle-pins, sleeve, and pin constitute an efficient mechanism for adjusting the position of the cut-off, for, as the weights are expanded, they operate through the toggle-pins to turn the sleeve upon the main driving-shaft B, thereby advancing the position of the eccentric E², and through the latter determining the action of the cut-off.

It is of course desirable that some means be provided for controlling the action of the weights upon the movable eccentrics in order that the point of cut-off may be varied and adjusted for different speeds, and to this end I combine with said weights an adjusting and indicating mechanism which operates to simultaneously adjust the speed and determine the proper point of cut-off at one operation.

The preferred form of adjusting mechanism is shown in Fig. 1, and is constructed and applied as follows: The outer end of the shaft B, or that portion extending beyond the eccentrics, is bored out, as at G, a cross-slot or opening, $g$, being formed in the portion next the eccentric D'. The tubular end of the shaft B rests in the cylindrical bearing formed in the head $A^4$, while an adjustable bearing, $A^5$, is made to enter and engage the inner conical surface, as shown in Fig. 2. Passing transversely through the shaft and arranged to reciprocate in the slot $g$ is a yoke, G', to which are pivoted on opposite sides one end of links $g'$, the opposite ends of said links being pivoted to one of the governor-weights, F'. The yoke G' is made in two parts, as shown in Fig. 3, to facilitate insertion through the slot $g$, each of said parts being composed of a plate or bar, $g^2$, and an offset or bracket, $g^3$, partially embracing the shaft and carrying the pin $g^4$, upon which the link $g'$ is hung. The two sections, being inserted through the slot from opposite sides of the shaft, are firmly secured in place by pins or screws $g^5$. Within the shaft B is located a spindle, $G^2$, having a flanged head, $g^6$, and a pivot, $g^7$, the latter resting in a center bearing, $g^8$, on the yoke G'. Passing through the bearing $A^5$ is a hollow screw, $G^3$, provided with a hand-wheel, $G^4$, the inner end of the screw being coned to form a bearing for a cap-plate, $G^5$, attached to a sleeve, $g^9$, sliding freely upon the spindle $G^2$. Surrounding the spindle $G^2$ and sleeve $g^9$ is a spiral spring, $G^7$, which bears against the flanged head $g^6$ and cap-plate $G^5$, tending to force them apart, but as the cap plate $G^5$ is held by a screw, $G^3$, the tendency of the spring is to move the yoke G' in a direction to hold the governor-weights down toward the shaft B. Attached to the head $A^5$ or other convenient portion of the frame is a gage-plate, L, with which the edge $l$ of the hand-wheel $G^4$ co-operates to indicate the number of revolutions at each adjustment.

The spindle $G^2$ and sleeve $g^9$, to which the spring $G^7$ is applied, constitute an extensible telescopic holder, which, being pivotally supported at either end by the screw $G^3$ and yoke G', is free to revolve either with or independently of the shaft B, and at the same time either section can be moved longitudinally upon the other by the application of sufficient power to overcome the tension of the spring, which latter tends at all times to force the sections apart. By means of the screw $G^3$ the tension of the spring is adjusted and the amount of resistance to be overcome by the weights of the governor in moving the eccentric is determined. The greater the pressure of the spring and the more resistance interposed to the governor the longer the stroke of the valve before the cut-off is brought into action, and vice versa. Thus, when the screw is run in to indicate, say, two hundred revolutions, the piston E will be operated to cut off at, say, three-fourths, whereas if the pressure of the spring is reduced until the point indicated is, say, one thousand five hundred revolutions, the eccentric $E^2$ will be proportionally advanced until it cuts off the steam at, say, one-eighth stroke. The valve D, being given a full-stroke, opens wide the ports for a determinate interval at each reciprocation before the piston E is caused to close the inlet-ports, and thereby cut off the supply of steam, and owing to the relative arrangement and movement of the valve D and piston E a quick cut-off is effected without the liability of chocking, that is so common with many adjustable cut-offs.

When the engine is started, the eccentrics D', $D^2$, and $E^2$ are held at nearly the same angle with respect to the shaft, the eccentric $E^2$ being slightly in advance, and in this position the cut-off has but a slight, if any, lead, while the steam is freely admitted to the cylinders at boiler-pressure for the full-stroke. This action continues until the governor, theretofore restrained and held under control by the spring, overcomes the tension of the latter, and by turning the sleeve advances the movable eccentric until the cut-off is set at the proper point to maintain the desired speed. The spindle $G^2$ and sleeve $g^9$, being pivotally supported at either end, are free to turn with or independently of the shaft B, and their longitudinal movement or adjustment is in no wise interfered with; hence the screw $G^3$ can be manipulated while the engine is in motion. A pointer, $m$, secured to a rod, $m'$, passing through the screw $G^3$ and attached to the spindle $G^2$, is employed for indicating the point at which the cut-off is acting.

All the working mechanism contained within the central chamber, A, is subjected to the lubricating action of the exhaust-steam and oil, and to facilitate its proper application to the bearings and governing devices cup-shaped receptacles $j$ $j'$ are formed in the head $A^4$, with ducts $j^2$ leading the one through the bearing $A^5$ and the other to the bearing for the shaft B and through perforations $j^3$ in said shaft and the conical bearing.

Instead of connecting the governor-weights to the yoke G' by links, wire ropes $h$ may be employed, passing over pulleys $h'$ and attached at opposite ends to the weights and yoke, respectively, as shown in Fig. 4, and the cut-off or expansion indicator may, if desired, be attached to a shaft, $n$, mounted in the casing and provided with a segmental rack, $n'$, gearing with an annular rack, $n^2$, supported upon segmental racks $n^3$, attached to the governor-weights near the pivots. Various means for adjusting the tension of the spring $G^7$ may also be employed. Thus, as shown in Figs. 4, 10, and 11, the outer end of the spring may be supported upon a tubular casing, $i$, carrying a pivot-bearing, $i'$, to receive the point of a sleeve, $i^2$, the latter being supported and adjusted by a screw-shaft, $i^3$, and held from turning with the casing $i$ by two pins, $i^4$, fastened to the head $A^4$ and entering holes in the said sleeve $i^2$. (See Figs. 10 and 11.) The casing $i$ carries a grooved ring, J, on the exterior of the shaft B, the said casing and ring being connected by pins J' passing through and working in longitudinal slots formed in the shaft B. Within the grooved ring J is located a collar, J², to which is pivoted one end of a pair of links, J³, for operating the pointer J⁴ of the speed-indicator. In this case the tension of the spring is adjusted by reciprocating the sleeve i² by means of the screw-shaft, whereby the casing i is moved inward or outward, carrying with it the grooved ring J and actuating the pointer J⁴.

Having thus described my invention, I claim as new—

1. In a rotary governor, the weights in the form of longitudinal sections of a frustum of a cone, suspended on transverse pivots applied to the rotary shaft, and with their outer or free ends hollowed to embrace the said shaft, substantially as and for the purpose described.

2. In a steam-engine wherein the working mechanism is contained within an inclosing-case, and in combination with the driving-shaft, a rotary governor applied to said shaft and provided with the segmental frusto-conical weights pivoted at or near the apex, said weights embracing the shaft toward their free ends, substantially as described.

3. In combination with the governor-weights, the toggle-pins and the sleeve embracing the driving-shaft and attached to the movable eccentric, the yoke connected to and moving with the weights located in a transverse slot in the shaft, and a tension device applied to said yoke, substantially as described.

4. In combination with the movable yoke connected to and actuated by the governor-weights, an extensible spring-pressure device located within the shaft and pivotally supported at one end by the yoke and at the other by an adjustable bearing, substantially as described.

5. In a steam-engine such as described, wherein the working mechanism is contained within an inclosing-case, and in combination, the direct-acting steam-valve, the cut-off, the governor for controlling the position of the cut-off, and the tension-regulator for the governor, and an adjustable spindle acting upon said tension device and carrying a pointer for indicating the speed, substantially as described.

6. In combination with the movable eccentric for actuating the cut-off, the valve-actuating eccentric slotted for the passage of the pin attached to the movable eccentric and carrying the brackets for the governor-weights, said weights being arranged to actuate the sleeve carrying the before-mentioned pin, substantially as and for the purpose set forth.

7. In combination with a direct-acting valve and a cut-off mechanism, such as described, for actuating and controlling the position of the cut-off, an adjustable regulator for said cut-off-actuating mechanism, an indicator whose position is controlled by the regulating mechanism to indicate the speed, and a second indicator controlled by the cut-off-valve-actuating mechanism to indicate the point of cut-off, substantially as described.

8. In combination with the slotted tubular portion of the driving-shaft, the yoke connected to the governor-weights, and the sleeve and spindle carrying the spring and pivotally supported, the one in the yoke and the other in the end of an adjustable screw or spindle passing through the end bearing for the shaft, substantially as described.

9. In combination with the slotted shaft, the bracket formed in two sections, each of the latter composed of a straight portion with lateral bracket embracing the shaft, the two sections being inserted from opposite sides and fastened together by bolts, substantially as described.

10. In combination with the main driving-shaft having a tubular extension, as described, the pivoted weights, the yoke passing through a slot in the shaft and connected to the weights, and a spring-tension device within the shaft bearing against the yoke and free to rotate independently of the shaft, substantially as described.

11. In combination with the main driving-shaft having the tubular extension, as described, the governor-weights pivoted to said shaft and actuating the movable eccentric, the yoke passing through said shaft and connected to the governor-weights, and the tension device bearing at one end against the yoke and at the other against an adjustable stationary bearing, substantially as described.

12. In combination with the shaft, the governor-weights for actuating the movable eccentric, pivoted at one end upon said shaft and extending longitudinally thereof, the yoke passing transversely through the shaft, the links connecting the yoke to the weights at or near their free ends, and the adjustable tension device applied to the yoke, substantially as described.

13. In combination with the main shaft and the governor-weights pivotally secured thereto and connected to the movable cut-off eccentric, the yoke, the telescopic support pivotally supported at one end upon said yoke, and the spring surrounding the said telescopic support and engaging the flanges or heads thereof, substantially as described.

14. In combination with the main shaft, the fixed eccentric provided with bearings to receive the governor-weights, the movable cut-off eccentric, the sleeve mounted upon the shaft, the pin passing through a slot in the fixed eccentric and uniting the sleeve and movable eccentric, and the toggle-pins extending from the sleeve to the heavier ends of the governor-weights, substantially as described.

15. In combination with the main shaft, the movable cut-off eccentrics, and the pivoted governor-weights borne by said shaft, the sleeve for actuating the movable eccentric, the yoke, and tension device applied thereto, both the said sleeve and the yoke being connected to the governor-weights at or near their free ends, substantially as described.

16. In combination with the main shaft, the segmental frusto-conical governor-weights pivotally supported upon said shaft and extending longitudinally thereof, and the sleeve mounted upon the shaft between the governor-weights and connected to the outer or free ends of the governor-weights and to the movable cut-off eccentric, substantially as described.

17. In combination with the main shaft and the governor-weights for actuating the cut-off, pivotally supported at one end and extending parallel with the shaft, the yoke located between the pivots of the governor-weights and connected to the latter near their outer or free ends, and the tension device applied to said yoke, whereby the pressure of the tension device is applied more nearly in line with the movement of the weights in proportion as the latter swing outward upon their pivots, substantially as described.

MIRABEAU N. LYNN.

Witnesses:
GEORGE M. ANDERSON,
FRANK L. BELLOWS.